United States Patent [19]

Kitamura

[11] Patent Number: 5,193,857
[45] Date of Patent: Mar. 16, 1993

[54] CONNECTOR

[75] Inventor: Hirokazu Kitamura, Kasugai, Japan

[73] Assignee: Tokai Rubber Industries, Ltd., Komaki, Japan

[21] Appl. No.: 618,624

[22] Filed: Nov. 27, 1990

[30] Foreign Application Priority Data

Mar. 30, 1990 [JP] Japan .................................. 2-86784

[51] Int. Cl.$^5$ ............................................. F16L 39/00
[52] U.S. Cl. .................................. 285/319; 285/321;
285/49; 285/921; 285/906
[58] Field of Search ............... 285/319, 320, 921, 348, 285/321, 49, 906

[56] References Cited

U.S. PATENT DOCUMENTS

| | | | |
|---|---|---|---|
| 4,601,497 | 7/1986 | Bartholomew | 285/319 |
| 4,846,506 | 7/1989 | Bocson et al. | 285/319 X |
| 4,913,467 | 4/1990 | Washizu | 285/319 X |

FOREIGN PATENT DOCUMENTS

| | | | |
|---|---|---|---|
| 2554543 | 5/1985 | France | 285/319 |
| 2633029 | 12/1989 | France | 285/319 X |
| 64-41794 | 9/1987 | Japan . | |

*Primary Examiner*—Dave W. Arola
*Attorney, Agent, or Firm*—Jacobson, Price, Holman & Stern

[57] ABSTRACT

A connector includes a first member and a second member. The first member includes a conduit having a ring-shaped projection formed at a rear end and a tubular body having first engagers and second engagers. The second member has a tubular shape, and includes third engagers and a presser formed adjacent to a rear end. The ring-shaped projection of the conduit engages with the first engagers of the tubular body, thereby preventing a relative movement between the conduit and the tubular body in an axial direction in the first member. Further, the second engagers of the tubular body engage with the third engagers of the second member, thereby preventing a relative movement between the first member and the second member in an axial direction in the connector. The presser of the second member presses the tubular body of the first member inwardly in a radial direction, thereby preventing a relative movement between the first member and the second member in a direction being perpendicular to an axial direction in the connector. Thus, the connector exhibits remarkably strong forces for engaging the first member with the second member in an axial direction as well as in a direction being perpendicular to an axial direction.

11 Claims, 2 Drawing Sheets

CONNECTOR

BACKGROUND OF THE INVENTION

1. Field of the Invention

The present invention relates to a connector for piping for connecting hoses which are employed to transfer a fluid such as gasoline, oil, water, air and the like.

2. Description of the Prior Art

As disclosed in Japanese Unexamined Utility Model Publication (KOKAI) No. 41794/1989 and illustrated in FIG. 5, a fitting for piping for connecting hoses has been known so far. The fitting for piping comprises a cylinder-shaped fitting body 300, annular seal members 500 disposed on an inner peripheral surface of the fitting body 300 and on an outer peripheral surface of a pipe 400 disposed in the fitting body 300, a retainer member 600 disposed in the fitting body 300 and assembled on an outer peripheral surface of the pipe 400 thereby retaining the seal members 500 and the pipe 400 in the fitting body 300.

The retainer member 600 is made of a flexible material. The retainer member 600 includes a tubular body 661 having an inner diameter substantially equal to an outer diameter of the pipe 400, the tubular portion 661 which includes an annular groove 661a disposed at a rear end having an inner diameter being greater than the inner diameter of the tubular body 661, and a plurality of leg portions 662 extending from a rear end of the tubular portion 661, bent outwardly and including a concaved groove 662a formed on an outer peripheral surface.

The retainer member 600 is inserted into the fitting body 300 at the tubular portion 661 thereof. The annular groove 661a of the retainer member 600 engages with an annular convexed portion 400a formed on an outer peripheral surface of the pipe 400, and the concaved groove 662a of the retainer member 600 engages with an annular flanged portion 300a formed on an inner peripheral surface of the fitting body 300 at a rear end, thereby holding the pipe 400 in the fitting body 300 and holding the seal members 500 with a front end of the tubular portion 661 by way of a bushing 700.

When the above-mentioned conventional fitting for piping is installed in a piping system and used actually, the pipe 400 is pressed in a direction coming out of the hose fitting body 300, the thus pressed pipe 400 is held by the leg portions 662 disposed between the annular groove 661a and the concaved groove 662a. Accordingly, the leg portions 662 are subjected to a flexural stress. Since the retainer member 600 is made of a flexible material, it is deformed and there arises rickety engagement between the fitting body 300 and the pipe 400. Further, when the fitting body 300 and the pipe 400 are subjected to an external force working in a direction being perpendicular to their axes, the leg portions 662 are again subjected to a flexural stress. Likewise, there arises rickety engagement between the fitting body 300 and the pipe 400.

In addition, since the concaved groove 662a of the leg portions 662 engages with the annular flanged portion 300a of the fitting body 300 at a rear, the rear end of the leg portions 662 protrudes from the rear end of the fitting body 300. As a result, when something is accidentally brought into contact with the protruding rear end of the leg portions 662, there is a fear for disengaging the above-mentioned engagement. Thus, the conventional fitting for piping might damage the reliability of a total piping system.

SUMMARY OF THE INVENTION

The present invention has been developed in view of the above-mentioned circumstances. It is therefore an object of the present invention to provide a connector exhibiting engagement forces in an axial direction and in a direction being perpendicular to an axial direction and giving a high reliability to a piping system.

The above and other object can be achieved by a connector of the present invention. The connector comprises:

a first member including a conduit, the conduit including a pipe-shaped nipple having a predetermined outer diameter and formed at a front end of the conduit and a ring-shaped projection formed integrally with the nipple and projecting in a flange-like manner in a centrifugal direction, and a tubular body, the tubular body including an axial hole in which the nipple of the conduit is disposed, a ring-shaped base to be disposed on an outer peripheral surface of the nipple at a front end of the ring-shaped projection of the conduit, a plurality of stoppers projecting from the ring-shaped base to a rear end of the ring-shaped projection and disposed in a circumferential direction, the stoppers having a first engager disposed on an inner peripheral surface of the stoppers and engaging with the ring-shaped projection thereby prohibiting a relative movement between the conduit and the tubular body in an axial direction, and a second engager disposed at a front end of the ring-shaped base and being deformable with an external force in a direction reducing a diameter thereof; and a second member formed in a tubular shape having an axial hole in which the first member is disposed, the second member including an engaging inner peripheral surface formed in the axial hole and engaging with an outer peripheral surface of the nipple of the conduit of the first member at a front end, a contacting surface formed in the axial hole and engaging with at least one of opposing front end surfaces of the conduit and the tubular body of the first member, a third engager formed in the axial hole and engaging with the second engager of the tubular body of the first member, and a presser formed adjacent to an opened end of the axial hole for inserting the first member and having an inner diameter being smaller than an outer diameter of the stoppers of the tubular body of the first member when the third engager engages with the second engager of the tubular body of the first member thereby pressing the first engager of the stoppers of the tubular body of the first member at least to the ring-shaped projection of the conduit of the first member.

When assembling the connector of the present invention, the nipple of the conduit constituting the first member is inserted into the axial hole of the second member. While inserting the nipple thereinto, the second engager of the tubular body constituting the first member is pressed inwardly in a radial direction by an inner peripheral surface of the presser of the second member, and accordingly the second engager is inserted into the axial hole with its diameter reduced. Here, the nipple of the conduit is disposed in the axial hole of the tubular body constituting the first member, and the ring-shaped projection of the conduit is engaged with the first engager of the tubular body.

Then, when the second engager of the tubular body arrives at the third engager of the second member, the second engager with the reduced diameter recovers its original diameter and engages with the third engager of the second member. At the same time, at least one of the opposing front end surfaces of the conduit and the tubular body constituting the first member gets in contact with the contacting surface formed in the axial hole of the second member, thereby completing the assembly of the first member and the second member. When assembled, the presser of the second member presses at least the first engager of the stoppers of the tubular body of the first member to the ring-shaped projection of the conduit of the first member because the presser of the second member has an inner diameter being smaller than an outer diameter of the stoppers of the first member.

In the above-mentioned state in which the first member and the second member are assembled, the first member and the second member are prevented more reliably from moving in an axial direction approaching each other in the case that the contacting surface is made to include a first contacting surface and a second contacting surface to be respectively brought into contact with an opposing front end surface of the nipple of the conduit of the first member and an opposing front end surface of the second engager of the tubular body of the first member.

Further, the first member and the second member are prevented from moving in an axial direction getting away from each other because the second engager of the tubular body is engaged with the third engager of the second member at the front end thereof and because the first engager of the tubular body is engaged with the ring-shaped projection of the conduit at the rear end thereof.

Furthermore, the first member and the second member are prevented from moving relatively in a direction being perpendicular to an axial direction because the conduit is elastically pressed by the presser of the second member by way of the first engager of the stoppers of the tubular body at least at the ring-shaped projection thereof.

As having been described in detail so far, in the connector of the present invention, the first member and the second member are securely prevented from moving in an axial direction approaching each other because the opposing front end surface of the first member and the contacting surface of the second member are brought into contact with each other. Further, the first member and the second member are prevented from moving in an axial direction getting away from each other because the first engager and the second engager of the tubular body are engaged with the ring-shaped projection of the conduit and the third engager of the second member respectively.

Moreover, in the connector of the present invention, the presser of the second member having an inner diameter being smaller than an outer diameter of the stoppers deforms the stoppers of the first member inwardly in a radial direction elastically, thereby pressing and holding at least the first engager of the stoppers onto the ring-shaped projection of the conduit. As a result, the first member and the second member are prevented from moving relatively in a direction being perpendicular to an axial direction. Accordingly, the connector of the present invention exhibits remarkably strong forces for engaging the first member with the second member in an axial direction as well as in a direction being perpendicular to an axial direction.

In addition, since the stoppers of the first member are covered with the second member, nothing gets in contact with the first engager of the stoppers of the first member accidentally, and accordingly no disengagement occurs between the first engager of the stoppers and the ring-shaped projection of the conduit. Thus, the connector of the present invention is a highly reliable connector.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified.

First Preferred Embodiment

Figure 1:
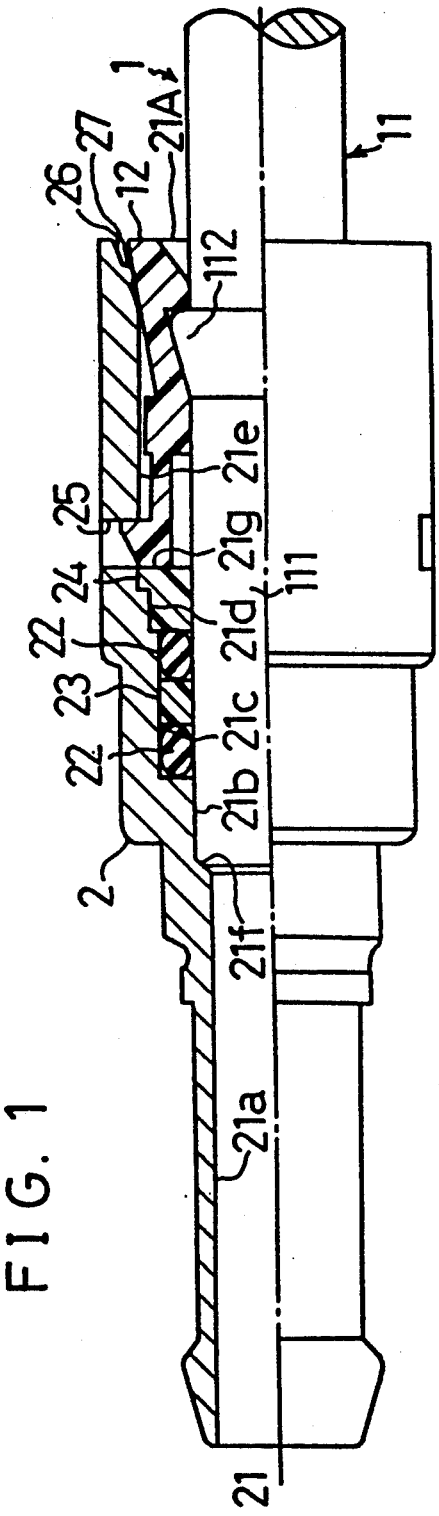
FIG. 1 is a side elevation view of a connector of a first preferred embodiment according to the present invention partly in section.

The connector of the first preferred embodiment according to the present invention will be hereinafter described with reference to FIGS. 1 through 3. As FIG. 1 illustrates a side elevation view of the connector of the first preferred embodiment, the connector comprises a first member 1 and a second member 2. Here, the terms "a front end" and "a rear end" as used herein refer respectively to "a left end" and "a right end" of component members illustrated in FIGS. 1 and 2.

The first member 1 comprises a conduit 11 made of a metallic pipe and a tubular body 12 made of nylon. The tubular body 12 has elasticity.

The conduit 11 of the first member 1 includes a pipe-shaped nipple 111 having a predetermined outer diameter and formed at a front end of the conduit 11, and a ring-shaped projection 112 formed integrally with the nipple 111 at a rear end, projecting in a flange-like manner in a centrifugal direction and having a gradually reducing diameter as it approaches to a front end. The conduit 11 may be made of the nipple 111 including the ring-shaped projection 112 and a pipe-shaped member detachably connected to the nipple 111 at an end thereof.

Figure 3:
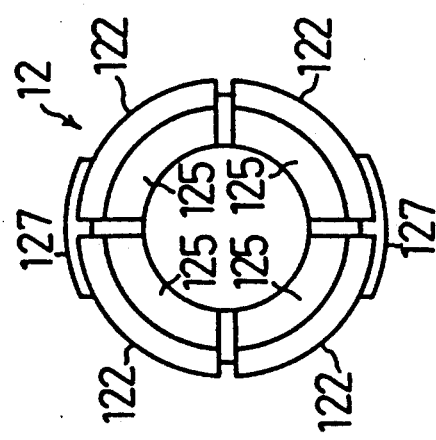
FIG. 3 is a front elevation view of the tubular body of the first member of the connector thereof.
Figure 2:
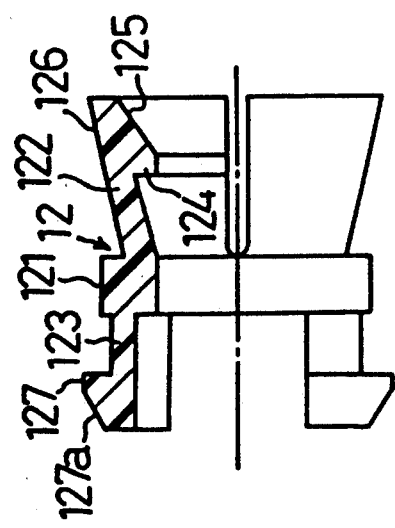
FIG. 2 is a side elevation view of a tubular body of a first member of the connector thereof partly in section.

As FIGS. 2 and 3 illustrate a side elevation view partly in section and a front elevation view of the tubular body 12 respectively, the tubular body 12 of the first member 1 includes a ring-shaped base 121, four (4) first stoppers 122 projecting integrally from the ring-shaped base 121 to one end and disposed in a circumferential direction and two (2) second stoppers 123 projecting integrally from the ring-shaped base 121 to the other end and disposed in a manner opposing in a vertical direction.

On an inner peripheral surface of the first stoppers 122, a first engager 124 and a first rear end tapered inner peripheral surface 125 are disposed. The first engagers 124 engage with the ring-shaped projection 112 of the conduit 11, thereby preventing a relative movement between the conduit 11 and the tubular body 12 in an axial direction, and the first rear end tapered inner peripheral surfaces 125 have an increasing diameter as it approaches to a rear end, thereby making the tubular body 12 more likely to slide on the ring-shaped projection 112 when inserting the conduit 11 into the tubular body 12. Further, on an outer peripheral surface of the first stoppers 122, a first rear end tapered outer peripheral surface 126 is disposed, and it has an increasing diameter as it approaches to a rear end.

The second stoppers 123 are provided with a second engager 127 at a front end, the second engager 127 which protrudes in a radial direction outwardly as illustrated in FIG. 3. The second engagers 127 include a second front end tapered outer peripheral surface 127a having a reducing diameter as it approaches to a front end.

The second member 2 includes a metallic tubular body having an axial hole 21 into which the nipple 111 of the conduit 11 of the first member 1 is inserted from an opened end 21A or a rear end 21A thereof. The axial hole 21 includes a fluid passage 21a, an engaging inner peripheral surface 21b, a seal member holding inner peripheral surface 21c, a collar member holding inner peripheral surface 21d and a cover inner peripheral surface 21e. The fluid passage 21a communicates with the nipple 111 thereby passing a fluid therein, and it has the smallest diameter. The engaging inner peripheral surface 21b engages with an outer peripheral surface of an front end of the nipple 111. The seal member holding inner peripheral surface 21c is disposed coaxially with the engaging inner peripheral surface 21b on a side of the rear end 21A. The collar member holding inner peripheral surface 21d is disposed coaxially with the seal member holding inner peripheral surface 21c on a side of the rear end 21A. The cover inner peripheral surface 21e is disposed coaxially with the collar member holding inner peripheral surface 21d on a side of the rear end 21A.

An inner diameter of the engaging inner peripheral surface 21b is greater than an outer diameter of the nipple 111 of the conduit 11 by 0.2 mm. A substantially perpendicular surface disposed at a rear end of the engaging inner peripheral surface 21b works as a first contacting surface 21f, thereby contacting with an opposing front end surface of the nipple 111.

On the seal member holding inner peripheral surface 21c, two (2) O-rings 22 and an annular collar 23 are disposed. The annular collar 23 having a rectangular shape in the partial cross sectional view is made of resin, interposed between the O-rings 23, and fixed on the seal member holding inner peripheral surface 21c.

On the collar member holding inner peripheral surface 21d, an annular collar 24 made of resin is disposed. The annular collar 24 is formed in a rectangular shape in the partial cross sectional view, and provided with an annular protruding portion disposed on an end of the collar 24 facing the rear end 21A, the annular protruding portion which engages with an annular stepped portion of the collar holding inner peripheral surface 21d. Thus, the annular collar 24 is prevented from moving to an end being opposite to the rear end 21A of the second member 2 in an axial direction, namely it is prevented from moving to a front end of the second member 1 in an axial direction. Further, the annular collar 24 and the annular collar 23 interposing one of the O-rings 22 therebetween prevent the O-ring 21 from moving in an axial direction. Furthermore, a perpendicular surface disposed at a rear end of the annular collar 24 works as a second contacting surface 21g, thereby contacting with an opposing front end surface of the tubular body 12 of the first member 1.

Moreover, engaging holes are formed on an end of the cover inner peripheral surface 21e being opposite to the opened end 21A for inserting the first member 1, i.e., on a front end of the cover inner peripheral surface 21e, and disposed in a manner opposing in a vertical direction, thereby engaging with the second engagers 127 of the tubular body 12. The engaging holes are thus made into the third engagers 25. In addition, a rear end side of the cover inner peripheral surface 21e is disposed in a manner opposing to the first rear end tapered outer peripheral surfaces 126, and formed in a second rear end tapered inner peripheral surface 26 having an increasing diameter as it approaches to a rear end. On the second rear end tapered inner peripheral surface 26, an annular projection 27 (i.e., a presser) is formed, thereby contacting with the first rear end tapered outer peripheral surfaces 126 of the first stoppers 122 of the tubular body 12. The inner diameter of the annular projection 27 is made smaller than a maximum outer diameter of the first rear end tapered outer peripheral surfaces 126 of the first stoppers 122 of the tubular body 12.

The connector arranged as above-mentioned is assembled as follows. At first, the nipple 111 of the conduit 11 is inserted into the axial hole of the tubular body 12 constituting the first member 1 starting at one end of the tubular body 12 with the first stoppers 122 disposed. The ring-shaped projection 112 of the conduit 11 is slid on the first rear end tapered inner peripheral surfaces 125 of the first stoppers 122 of the tubular body 12, and got over the first engagers 124 of the first stoppers 122, thereby engaging the ring-shaped projection 112 of the conduit 11 and the first engagers 124 of the first stoppers 122.

Then, the nipple 111 of the conduit 11 of the first member 1 is inserted into the axial hole 21 of the second member 2. When inserting the nipple 111, the second engagers 127 formed at a front end of the second stoppers 123 are slid on the cover inner peripheral surface 21e and entered into the second member 2, and thereby the second front end tapered outer peripheral surfaces 127a of the tubular body 12 are pressed inwardly in a radial direction and the diameter thereof is reduced by the annular projection 27 formed on the second rear end tapered inner peripheral surface 26 of the second member 2.

When the second engagers 127 of the tubular body 12 arrive at the third engager 25 of the second member 2, the second engagers 127 recover their original diameter, and thereby the second engagers 127 engage with the third engager 25. At the same time, the opposing front end surface of the conduit 11 constituting the first member 1 contacts with the first contacting surface 21f formed in the axial hole 21 of the second member 2 and the opposing front end surface of the tubular body 12 constituting the first member 1 contacts with the second contacting surface 21g of the collar 24. The connection of the first member 1 and the second member 2 has been thus completed. Also at this moment, the annular projection 27 formed on the second rear end tapered inner peripheral surface 26 of the second member 2 presses the first rear end tapered outer peripheral surfaces 126 of the tubular body 12 inwardly in a radial direction. Accordingly, the first stoppers 122 of the tubular body 12 are deformed elastically, and inner peripheral surfaces thereof are pressed heavily onto the conduit 11 and the ring-shaped projection 112. Thus, the first engagers 124 are held between the annular projection 27 and the conduit 11.

In the case that the first member 1 and the second member 2 should be disconnected, an extra member is inserted into the engaging hole formed in the second member 2 and constituting the third engager 25. Accordingly, the second engagers 127 of the tubular body 12 are pressed inwardly in a radial direction, and the diameter of the second engagers 127 is reduced, thereby disconnecting the second engagers 127 of the tubular body 12 of the first member 1 and the third engagers 25 of the second member 2.

When the first member 1 and the second member 2 are connected together, the opposing front end surfaces of the conduit 11 and the tubular body 12 get in contact with the first contacting surface 21f formed in the axial hole 21 of the second member 2 and the second contacting surface 21g of the collar 24 respectively. Accordingly, the first member 1 and the second member 2 are securely prevented from moving in an axial direction approaching each other. In addition, since the second engager 127 of the second stoppers 123 of the tubular body 12 engages with the third engager 25 of the second member 2 and since the first engager 124 of the first stoppers 122 of the tubular body 12 engages with the ring-shaped projection 112 of the conduit 11, the first member 1 and the second member 2 are also securely prevented from moving in an axial direction getting away from each other. Therefore, the first member 1 and the second member 2 are connected together, and thereby they are reliably prevented from moving relatively in the axial directions.

Further, since the first stoppers 122 of the tubular body 12 are elastically deformed by the annular projection 27 of the second member 2 inwardly in a radial direction and an inner peripheral surface of the first stoppers 122 is pressed onto the conduit 11 and the ring-shaped projection 112, the first engagers 124 are held between the annular projection 27 and the conduit 11. Accordingly, the first member 1 and the second member 2 are reliably prevented from moving relatively in a direction being perpendicular to an axial direction. A contacting force is further exerted to the thus held portion, i.e., the first engager 124 of the first stoppers 122, in a direction being perpendicular to an axial direction, and another contacting force is also exerted to a portion disposed greatly away from the first engagers 124, i.e., to a portion between a front end outer peripheral surface of the nipple 111 and the engaging inner peripheral surface 21b of the second member 2 also in a direction being perpendicular to an axial direction. These contacting forces further prevent the first member 1 and the second member 2 from moving relatively in a direction being perpendicular to an axial direction. Here, it is apparent that the holding force exerted to the first engager 124 of the first stoppers 122 can also prevent the first member 1 and the second member 2 from rotating relatively.

Moreover, since the cover inner peripheral surface 21e of the second member 2 is extended to a rear end surface of the first stoppers 122 of the tubular body 12, nothing gets in contact with the first engager 124 of the first stoppers 122 of the first member 1 accidentally, and accordingly no disengagement occurs between the first engagers 124 and the ring-shaped projection 112. Thus, the connector of the first preferred embodiment has been made into a highly reliable connector.

Second Preferred Embodiment

Figure 4:
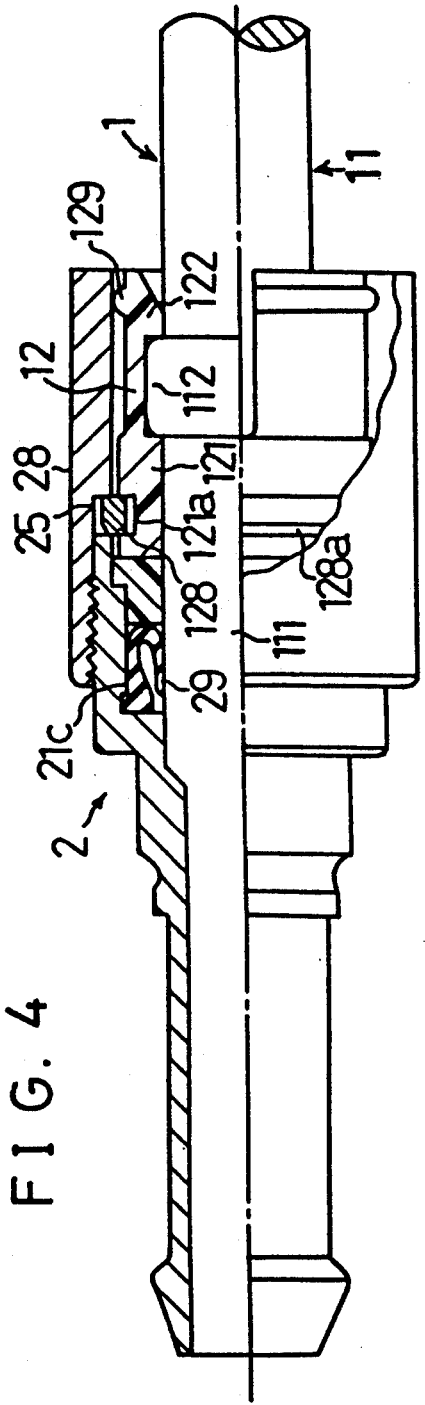
FIG. 4 is a side elevation view of a connector of a second preferred embodiment according to the present invention partly in section.
Figure 5:
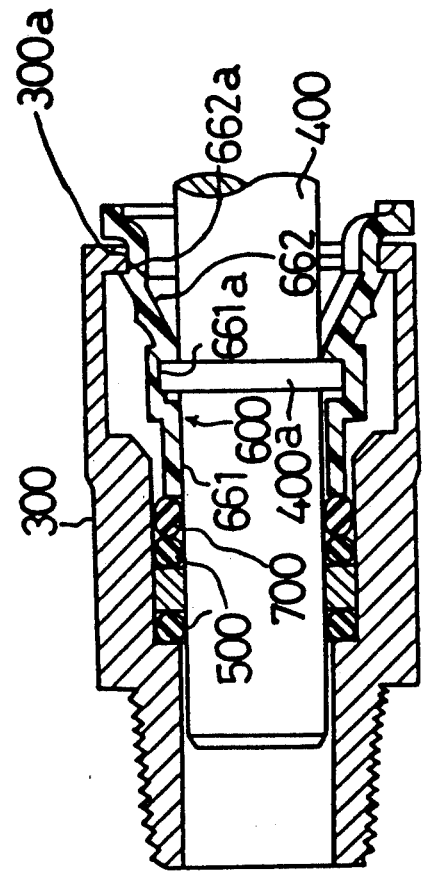
FIG. 5 is a side elevation view of a conventional connector partly in section.

The connector of the second preferred embodiment according to the present invention will be hereinafter described with reference to FIG. 4 illustrating a side elevation view thereof partly in section. The terms "a front end" and "a rear end" as used herein also refer respectively to "a left end" and "a right end" of component members illustrated in FIG. 4.

A tubular body 12 of the connector includes an annular groove 121a instead of the second stoppers 123 of the tubular body 12 of the first preferred embodiment. The annular groove 121a is formed on an outer peripheral surface of a base 121, and a spring steel 128 having an outer diameter being greater than the outer diameter of the base 121 is accommodated in the annular groove 121a. The spring steel 128 is formed in a "C"-shaped ring opened at both ends thereof, and has a tapered surface 128a at a front end thereof having a reducing diameter as it approaches to a front end. Further, a projection 129 is disposed on a rear end outer peripheral surface of the first stoppers 122 instead of the first rear end tapered outer peripheral surface 126 of the first stoppers 122 of the first preferred embodiment.

A second member 2 of the connector includes a metallic tubular cover 28 screwed on a front half thereof. In the second member 2 of the second preferred embodiment, the metallic tubular cover 28 constitutes the cover inner peripheral surface 21e of the second member 2 of the first preferred embodiment, and has a third engager 25 formed on an inner peripheral surface at an end being opposite to an opened end for inserting the first member 1, i.e., at a front end. The third engager 25 has an inner diameter being greater than an inner diameter of a rear half of the metallic tubular body 28. Further, a rubber packing 29 is disposed on a seal member holding inner peripheral surface 21c instead of the O-rings 22 of the first preferred embodiment. Here, in the connector of the second preferred embodiment, an inner peripheral surface of the metallic tubular cover 28 works as a presser, and an inner diameter of the metallic tubular cover 28 is made smaller than an outer diameter of the projections 129 formed on the first stoppers 122 of the tubular body 12.

In the connector of the second preferred embodiment, the diameter of the spring steel 128 is reduced because the tapered surface 128a of the spring steel 128 is brought into contact with a rear end surface and an inner peripheral surface of the metallic tubular cover 28 when the first member 1 is inserted into the second member 2. The spring steel 128 is entered into the second member 2 while it is slid on the inner peripheral surface of the tubular cover 28. When the spring steel 128 arrives at the third engager 25, the spring steel 128 recovers its original diameter, and thereby the spring steel 128 engages with the third engager 25. At the same time, since the projections 129 formed on the first stoppers 122 of the tubular body 12 are pressed by the inner peripheral surface of the metallic tubular body 28 inwardly in a radial direction, an inner peripheral surface of the first stoppers 122 is pressed heavily onto a conduit 11 and a ring-shaped projection 112. On the contrary, the first member 1 and the second member 2 can be disconnected by unscrewing and detaching the metallic tubular cover 28 from the front half of the second member 2. Thus, it is apparent that the connector of the second preferred embodiment works and effects advantages in a manner similar to that of the connector of the first preferred embodiment.

Having now fully described the present invention, it will be apparent to one of ordinary skill in the art that many changes and modifications can be made thereto without departing from the spirit or scope of the present invention as set forth herein.

What is claimed is:

1. A connector comprising:

a first member, including a conduit and an elastic tubular body, and a second member;

said conduit including a pipe-shaped nipple formed at a front part of said conduit and a ring-shaped projection projecting radially outward at a rear end of said nipple;

said tubular body including a ring-shaped base having an axial hole therethrough for receiving said nipple, first stoppers elastically deformable in a radial direction projecting from a rear end of said ring-shaped base, said first stoppers including first engagers projecting radially inward of said stoppers and contacting a rear end surface of said ring-shaped projection for preventing relative movement between said conduit and said tubular body in a rearward axial direction, second stoppers including second engagers projecting radially outward from said second stoppers;

said second member having an axial hole for receiving said conduit and said tubular body, an engaging inner peripheral surface formed in said axial hole contacting an outer peripheral surface of a front end part of said nipple, a third engager formed in said axial hole and engaging with a surface of said second engager facing in the rear direction for preventing said tubular body from moving in a rearward axial direction relative to said second member;

said first engager of said first stoppers of said tubular body has a larger thickness in a radial direction than a radial direction between an inner peripheral surface of a rear end part of said second member and an outer peripheral surface of a rear end part of said conduit so that when said first member is pressed into said axial hold of said second member, said inner peripheral surface of said second member and said outer peripheral surface of said conduit compress said tubular body in a radial direction so that said first member and said second member are locked against movement in the radial direction.

2. A connector comprising:

a first member, including a conduit and an elastic tubular body, and a second member;

said conduit including a pipe-shaped nipple formed at a front part of said conduit and a ring-shaped projection projecting radially outward at a rear end of said nipple;

said tubular body including a ring-shaped base having an axial hole therethrough for receiving said nipple, first stoppers elastically deformable in a radial direction projecting from a rear end of said ring-shaped base, said first stoppers including first engagers projecting radially inward of said stoppers and contacting a rear end surface of said ring-shaped projection for preventing relative movement between said conduit and said tubular body in a rearward axial direction, second stoppers including second engagers projecting radially outward from said second stoppers;

said second member having an axial hole extending though an end thereof for receiving said conduit and said tubular body, an engaging inner peripheral surface formed in said axial hole contacting an outer peripheral surface of a front end part of said nipple, a third engager formed in said axial hole and engaging with a surface of said second engager facing in the rear direction for preventing said tubular body from moving in a rearward axial direction relative to said second member;

said first engager of said first stoppers of said tubular body has a larger thickness in a radial direction than a radial direction between an inner peripheral surface of a rear end part of said second member and an outer peripheral surface of a rear end part of said conduit so that when said first member is pressed into said axial hold of said second member, said inner peripheral surface of said second member and said outer peripheral surface of said conduit compress said tubular body in a radial direction so that said first member and said second member are locked against movement in the radial direction.

3. The connector according to claim 2, wherein aid ring-shaped projection of said conduit of said first member has a reducing diameter as it approaches to a front end thereof.

4. The connector according to claim 2, wherein said second engager of said tubular body of said first member includes a tapered outer peripheral surface disposed at a front end thereof and having a reducing diameter as it approaches to a front end thereof, and a cylindrical surface disposed at a rear end thereof and formed in a stepped manner when it is viewed in a cross section.

5. The connector according to claim 2, wherein said contacting surface of said second member includes a first contacting surface and a second contacting surface disposed away from said first contacting surface rearward in an axial direction, said first contacting surface contacts an opposing front end surface of said conduit of said first member, and said second contacting surface contacts an opposing front end surface of said tubular body of said first member.

6. The connector according to claim 2, wherein said axial hole of said second member includes a tapered inner peripheral surface at said end of said axial hole for receiving said first member, said tapered inner peripheral surface having an increasing diameter as it approaches to said end.

7. The connector according to claim 2, wherein said tapered inner peripheral surface has a presser formed thereon disposed adjacent to said end, said presser having an annular shape and projecting inwardly in a radial direction.

8. The connector according to claim 2, wherein said second engager of said tubular body of said first member is formed of spring steel and is disposed around said tubular body at a front end thereof, said spring steel second engager having an outer diameter at least greater than an outer diameter of said ring-shaped base of said tubular body, thereby engaging with said third engager of said second member.

9. The connector according to claim 2, wherein said axial hole of said second member includes a cylindrical surface adjacent to said end of said axial hole for receiving said first member, and said stoppers of said tubular body of said first member includes a presser formed on an outer peripheral surface thereof adjacent to said opened end, projecting outwardly in a radial direction, and having an outer diameter prior to insertion in said second member greater than an inner diameter of said cylindrical surface of said axial hole of said second member.

10. The connector according to claim 2, wherein said stoppers of said tubular body of said first member are covered by said second member.

11. A connector according to claim 2, wherein said third engager is located between said front part and said rear end part of said conduit when said conduit is received in said second member.

* * * * *